Patented Aug. 8, 1950

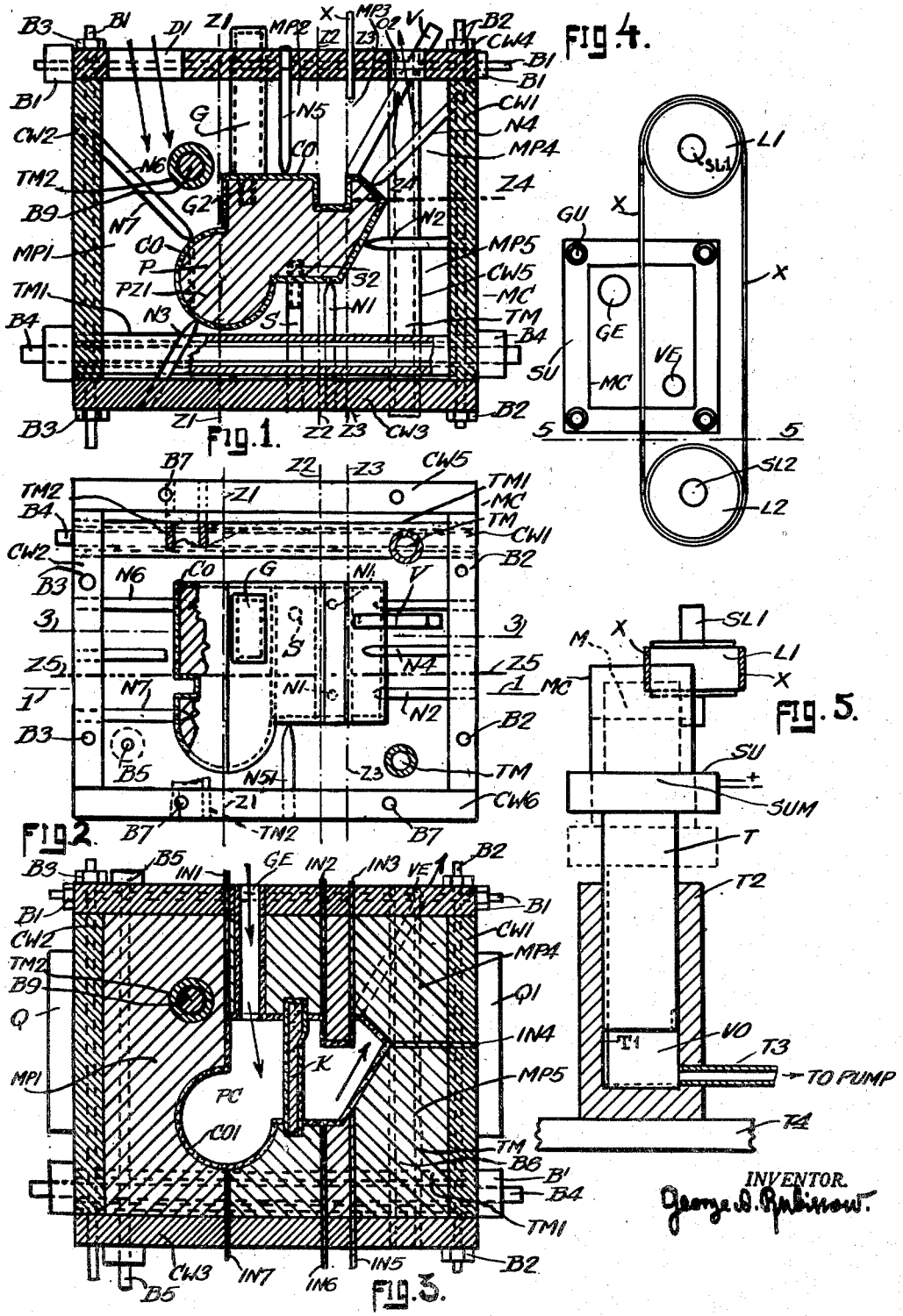

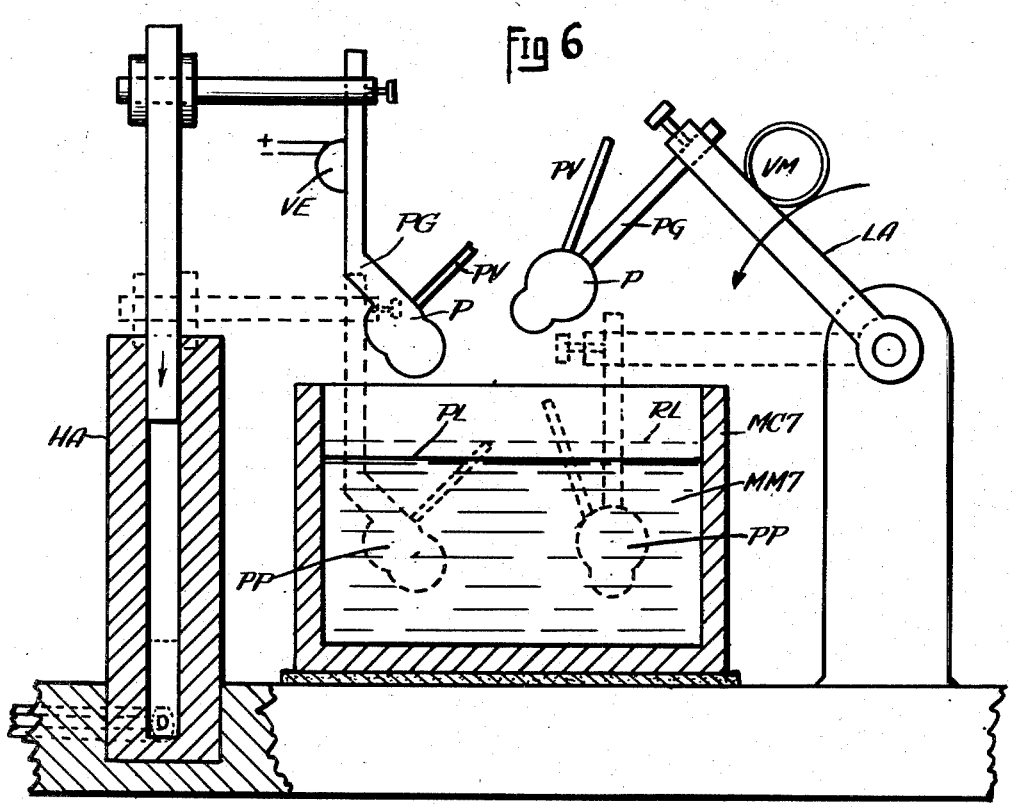

2,517,802

UNITED STATES PATENT OFFICE 2,517,802

METHOD FOR MAKING MOLDS

George A. Rubissow, New York, N. Y.

Application December 17, 1945, Serial No. 635,579

6 Claims. (Cl. 22—193)

Various methods and means are known for making molds and compound molds, by providing a female impression of a given pattern in such molds.

This invention provides a new method for making compound molds, even those with most intricate mold cavities, of any desirable material by simple and most economical means.

The main aspect of this invention comprises affixing a pattern, preferably having a pouring gate and one or more risers or vents affixed to it, in a mold casing so that room is provided all around of said pattern, thereafter pouring in the molten or pasty or granular material into said mold casing thus embedding said pattern in it, and thereafter permitting said molten material to solidify or said pasty or granular material to set, and thereafter to cut by means of a saw, (or a knife when knife could be used) the solidified or set material (including the sawing of the mold casing if desired) and also sawing or cutting the pattern embedded therein, in at least, two or more mold and pattern parts in such a manner that the sawed pattern parts may be removed by pulling them out or removed otherwise from respective mold parts, leaving therein respective female impregnations of said pattern parts, thereafter assembling the mold parts into a mold with or without assistance of filling by an insert or coating the spaces left by the saw or the knife.

The material used for making the molds and/or the patterns and/or the mold-casings, may comprise among others, one of the following materials:

(a) Metal or metal alloys including steels, non-oxidable steels, and any other iron-carbon alloys, copper alloys, beryllium copper alloys, aluminum alloys, magnesium alloys, Wood's fusible metal and the like alloys, etc.

(b) Mixture of metals with refractories including such as powdered metal-oxides, such as MgO, $Al_2O_3$, etc., sand, bentonite, fire-clay, dolomite, talcum, graphite, cements, clay, etc.

(c) Any type of refractories including the here above mentioned in (b) refractories used with or without binders.

(d) Natural or artificial rubber, or latex, or rubber containing materials, or mixture of rubber with fine grained refractories, plastics, or with such admixtures as powdered or fine grained wood, or cork-wood, etc.

(e) Artificial plastics, and resins, including among others Bakelite, Lucite, cellophane, and natural resins, and animal substances, including among others, shellac, solidified animal blood.

(f) Glass or the like materials and various forms of silica.

The material used for making the mold may or may not be the same as the material used for the pattern and/or for the mold-casing.

The pattern may be made of a material the melting point of which is higher than the melting point of the material used for making the mold.

This invention will be more clearly understood by the following description of the figures, which do not limit the invention thereto, but describe some of the preferred embodiments only.

In the figures:

Fig. 1 is a diagrammatical cross-sectional side view along 1—1 of Fig. 2, of a mold-casing with the pattern.

Fig. 2 is a diagrammatical plan view of Fig. 1, the cover plate taken off, and with parts broken out.

Fig. 3 is a diagrammatical cross-sectional side view along 3—3 of Fig. 1, representing a completed mold from where the pattern was removed.

Fig. 4 is a schematical plan view of one of the embodiments used for slicing of the mold and of the pattern embedded in such mold.

Fig. 5 is a schematical cross-sectional side view of Fig. 4, along a plane 5—5.

Fig. 6 is a schematic side view of another embodiment of this invention.

In Figs. 1, 2 and 3, the mold casing MC is shown as an example in the form of a rectangular box made of six casing walls CW1, CW2, CW3, CW4, CW5, and CW6. The mold-casing MC may be of any form and contour, for instance a sphere, a cylinder, a cube, a pyramid, etc. In many cases, the use of the top cover is not necessary, and a mold-casing open at the top may be used.

All the casing walls may form a rigid interconnection in between them, i. e., the mold-casing may be an integral solid box, or the casing walls may be attached one to another for instance, by pivoting means, or by provisions of keys and grooves, or by means of screws, etc., so that they may be disconnected one from another and thus free the mold which they enclosed.

The casing wall CW1 up to CW6, are affixed one to another by the compression force due to the use of tightening bolts with nuts such as B1, B2, B3, and B7 passing inside of the casing walls, i. e., throughout the wall itself.

If desired, one or more tightening bolts with nuts such as B5 shown in Figs. 2 and 3, may pass through the casing walls CW4, CW3, while passing inside of the mold-casing. Similarly bolt with nut B4 passes through walls CW1 and CW2.

The pattern P may be made from any suitable material and may comprise one or more gate-pattern, and/or one or more riser-pattern or vent-pattern, affixed to the pattern P or forming one integral solid part therewith. The expression "pattern" (used herein) may include the gate-pattern, vent-pattern, etc.

According to this invention the pattern P should be placed in the mold-casing MC, in such a manner that the material used for making the mold will be able to embed the whole pattern, and that the pattern will not be thrown out of place when the material (molten or in grains) is poured into the mold-casing.

For this purpose and by way of example the pattern P, Figs. 1 and 2, may be provided with at least one attaching means affixing the pattern P to a wall of the mold-casing MC. For this purpose a pouring-gate-pattern G and/or a riser-pattern or vent-pattern V, forming an integral part with the pattern P may be used as such attaching means. Thus the pattern may be held in a desirable position in the mold casing MC by affixing these attaching means to one of its casing walls.

When more than one of such pouring-gate-pattern and/or riser-pattern of vent-pattern are used, they may be attached to several casing-walls.

By example in Figs. 1 and 2 the pattern P is affixed to the upper casing-wall CW4 by means of such attaching means G and/or V. If desired openings of the same cross sections as the cross sections of these attaching means could be provided in the walls of the mold-casing, as shown on Fig. 1. Such attaching means may be screwed on, or soldered to, or otherwise affixed to these mold-casing walls.

In case that mold-casing without top cover are used, then the pattern P could be affixed to the pouring-gate pattern G and/or the riser-pattern or vent-pattern V. The pouring of the molten material can then be made easily through the open top of such a mold-casing.

In the example shown in Fig. 1, the pouring of the molten material can be done through an opening O1 specially provided therefore, and in this case the poured in molten material will embed the pattern P and the pouring-gate-pattern G and the riser-pattern or vent-pattern V.

The gases, if any, could escape through the opening O2, Fig. 1, provided therefore.

Instead of affixing the pattern P by means of gate-pattern G and/or vent-pattern V, the pattern P may be held in a desired position while resting on three or more needles, for instance, resting on needles, or the like supports, N1, N2, N3 and held in position on needles or supports, N4, N5, N6, N7 as shown in Fig. 1.

The needles may be attached to the wall casing in any desirable manner, for instance, the bottom part of the needles may have a threading, or the needles may tightly fit into openings provided in the wall of the mold casing so that the friction will hold them in the desired position, as shown for the needles N3 and N5. The proper length of needle may be controlled by means of a to and fro movement in such openings or by turning them if threading is used.

The needle points on which the pattern may rest may be sharp-pointed, or flat, or of any desirable form.

Still another manner of affixing the pattern P to the mold-casing is shown by the use of a support S which may be of any form and which on one of its sides is rigidly affixed to the mold casing and on the other rigidly affixed to the pattern.

The pattern P may also be simply suspended on cables or wires, affixed to one or more of the casing-walls. If the specific weight of the pattern is lighter than the specific weight of the molten material or of the metal poured into the mold-casing, then the pattern may, before the pouring of molten material is started, rest on the bottom, and when the molten material will start to fill the mold-casing, it will lift the pattern until the wires or cables attached to it become tightened, thus giving a predetermined position to the pattern in the mold-casing.

According to this invention, the mold-casing with the pattern P placed therein as heretobefore described, is filled either with the molten material (when casting is made in molten material), or is filled with a powdered or pasty or granular material (when casting is made in powdered or pasty or granular casting materials). Thereafter the molten material is solidified, or powdered or pasty or granular material is set, (such as by example, powdered metal for powdered material, or cement or gypsum for pasty material, or sand with core oil for granular material). Thereafter the mold-casing may be removed or it may remain and form one integral part with the mold making material solidified therein, and such solidified or so set mold making material, with the pattern and its support embedded therein, and with or without the mold-casing, is then subjected to dividing or parting action by means of sawing the mold, (with or without mold casing) with the pattern embedded therein, into at least two separate parts. If supports, used for keeping the pattern in a desired position in the mold casing, are in the plane of sawing, then they are inevitably also sawed through. The sawings in question may be made in any desirable or suitable plane or planes of sawing and in any suitable direction, from top to bottom, from side to side, and such sawings may follow part way through the mold and the pattern and/or the supports of said pattern, if they are in the plane of such sawing or sawings.

When the pattern P is an intricate pattern, it is required that the mold and the pattern are sawed by means of a saw X into several parts, for instance, sawed in planes as shown in Figs. 1, 2, 3, by a sawing arrangement such as for instance shown in Figs. 4 and 5.

Such sawing may be made along the planes Z1—Z1, Z2—Z2—Z3—Z3—Z4—Z4, when looking in Fig. 1, thus the mold will be divided into the mold parts: MP1, MP2, MP3, MP4 and MP5, as shown in Fig. 3. The mold part MP1 may be divided into two mold parts, if the sawing will be made along plane Z5—Z5 and stopped when reaching the plane Z1—Z1, as shown in Fig. 2.

The mold part MP4 when sawed along Z5—Z5 may be divided into MP41 and MP42, if desired.

When the desirable amount of sawing (or cutting, if a knife is used instead of a saw) is made, then the respective pattern-parts which are embedded in each piece of the sawed mold parts, for instance, as the half-cylinder pattern-part PZ1 in Fig. 1, may be removed from the mold-part MP1, and the female impression PZ1 will be left therein forming thus a part of the mold cavity PC in Fig. 3.

After removal from respective mold-pattern-part, obtained by sawing of all the parts of the pattern, and gates-pattern and vents-pattern, if any, all mold parts so obtained are then reassembled together as shown in Fig. 3, and the mold is thus formed ready for use.

The assembling of the mold parts may be made by using bolts and nuts, such as shown in Figs. 1, 2 and 3 the tightening bolts B2, B3, etc., or such as bolts and nuts B1, B4, B5, B7 and B9 (one or more of them may be used) and in any plane and/or in any direction, if desired.

Prior to sawing the mold (with or without the mold-casing) these bolts may have been inserted in holes, of about the same diameter as the bolts or of a slightly larger diameter in order to permit the use of a coating applied on the bolts and/or a coating applied on the surface of the holes for an easier removal of the bolts from such holes before the sawing of the solidified mold making material, and/or for easier insertion of the bolts into such holes after the mold is ready made.

When the bolts are not removed before sawing, then after sawing, for instance, along the planes Z1—Z1, Z2—Z2, etc., the bolts are respectively sawed into bolt-parts along these planes. Once the mold-parts are sawed the bolt-parts within them may be removed and the holes cleaned, and when the assemblance is made, new bolts (of same or smaller diameter) may be inserted along all of the length of holes and the mold parts may be thus held tightly together and have the mold ready for casting.

It is obvious that the thickness of the sawing blade or of the saw, should be taken in consideration in cases when the assembly of the mold parts will provide a respective shortening in one or more planes of the mold cavities, due to the sawing away of the corresponding parts of the mold material.

Such shortenings may be compensated by an advance appropriate calculation of the dimensions of the pattern P, taking into consideration the change in dimension (such as shrinkage or augmentation of dimension) caused by the solidifying or setting of the material used for making the mold and/or due to the casting process made in molds so obtained.

One of the aspects of this invention comprises the use of hollow tubular means (round, square or otherwise shaped in their cross-section) such as TM, TM1—TM2 in Figs. 1, 2 and 3, which tubular means are so placed that they may extend in any desired plane or direction inside of the mold-casing, and may pass, for instance, from side to side, or from top to bottom, etc., and may also traverse in total or in part the thickness of the casing-walls, the latter arrangement is of importance when mold-casing is sawed together with the mold and the pattern. Such tubular means traversing the mold-casing should be so mounted in this mold-casing that the hollow and the open sides of such tubular means will not be accessible to the molten material when same is poured into this mold casing for embedding of the pattern, the pattern-supporting means and also embedding the outer walls of the said tubular-means, all of them becoming one integral body of the mold. When the mold (with or without mold-casing) is sawed into parts, the tubular means TM are also sawed into respective portions of the tubular means as shown in Fig. 1.

When the sawing is finished and the part-mold-cavities are formed by removing the respective pattern-parts, then the hollows of the tubular means are used as channels or as holes for tightening bolts which are placed inside of these tubular means, and thus permitting the assembly of the mold parts into the mold. In many cases, for instance, when the planes of sawing are all parallel one to another, one tubular member may suffice.

For sawings as shown in Figs. 1, 2 and 3, tubular means TM1 and TM2 with two bolts B4 and B9, may suffice.

Tubular means may also be used as mold-casing tightening means, in which case the bolts are placed inside of them before and during the pouring of the molten material.

The bolts may be tightened by means of nuts or other locking means such as keys, levers, cams, etc., well-known in the practice. Also instead of bolts, cables and chains, may be used with means to tighten them and to interlock them in tightened positions.

It may be noted, that for easier assembly, the tubular means should be mounted in such a plane and direction that when the mold and the tubular means are sawed, the sawing is made in a plane perpendicular to the longitudinal axis of such tubular means to avoid shearing displacement of mold-parts when tightened for assembly. This however, is not limiting sawing of tubular means at any desired angle.

For large pattern, say of some 10" x 20" x 10" or larger overall dimensions and in case of say, making the sawing along three planes, and considering that the thickness of each sawing is $3/64$", the total sawed away thickness will be 3 x $3/64$" equal to $9/64$". It is easy to compensate this $9/64$" in making correspondingly larger pattern, by adding three times $3/64$" to the original pattern P, each addition at about the same three places where such $3/64$" are thereafter sawed away. Such arrangement will permit having a mold-cavity (without using any compensation-insertion such as IN1—IN7 in Fig. 3) of same dimension as the original pattern P, said mold-casing may, for example, be an integral box open on the top, and being provided either (1) with one or more tubular members TM or TM1 or TM2, as shown in Figs. 1, 2 and 3, made of steel, or high-temperature refractory or other suitable material; or (2) with bolts such as bolts B4 or B9, as shown in Figs. 1, 2 and 3. When such an integral box-like mold-casing is filled with the molten material, and the same is solidified then the mold-casing, the mold and pattern are sawed into mold-parts. The tubes TM, TM1 and TM2, are also sawed along respective sawing planes, and may thereafter be used as ready made holes for tightening bolts, used for assembly of the mold parts, into a mold. When castings to be made in such molds are made from iron-carbon alloy, the melting temperature of which is high (about 2850° F. or more) the sawed away spaces may be in toto or substantially in toto recompensated when making the assembly of the mold part. For instance, if there are three mold parts in one direction, i. e., the mold was sawed three times as shown in Fig. 1, and supposing that the thickness of each sawing space is $1/32$", then the total sawed out thickness will be 3 x $1/32$" equal to $3/32$".

When assembling the mold parts the sawed out total of $3/32$" may be left to remain and may be controlled by insertion in between the mold parts of some spacing bands or strips say of some $1/4$" or 1" in width and only $1/32$" or $1/64$" in thickness as shown diagrammatically and on an enlarged scale, by IN1 or IN3 in Fig. 3. The strips may follow one another at any desirable interval, leaving thus in between them spaces of about 1/32" or 1/64" in thickness and say of some 1/2" or 1" or 2" or 3" in width, these so formed spaces, may according to this invention serve as air-vents for gas escape. The molten metal filling the mold-casing will also start to fill these spaces, but generally will freeze at a certain distance from the mold-cavity forming some kind of ribs. After removal of the cast produced these so formed ribs are easily broken away, or filed or sawed away. For large castings, this method may be used with great advantage, and the removal of the ribs so formed in such spaces will present no difficulty.

When it is desired not to have any such spaces, the insertions IN1—IN2—IN3—IN7, as shown in Fig. 3, may fill all the sawed away spaces, in which case the thickness of such insertions should be substantially the same as the thickness of the saw which had sawed the mold. The provision of bolts and holes passing through the casing-walls or passing through the mold and these walls, is of greatest importance because it permits to reassemble accurately the mold-art, and obtain the mold ready for casting.

To assemble the mold-parts together, to keep them tightened one to another may also be achieved by using a viselike jaw, having for instance, two jaws Q and Q1, as shown in Fig. 3, which compress the mold part into a mold instead of using the bolt system.

In Fig. 3, is shown a core K, which was inserted into the mold cavity MC. This is shown as an example only, in order to illustrate that such core or cores may be added to the mold-cavity whenever it is desirable. The mold in Fig. 3, may be made by way of example only, from steel, or copper-alloy, and the core K, from cement, or sand, or other refractory.

The mold may be a permanent one and the core may be a non-permanent one, or the mold and the core K, both may be permanent, and then the core K, may be also made from metal or alloy, and may be composed of several core-parts, in order to facilitate its removal from the cast product. Should core K in Fig. 3, be made from a metal, then the mold-part MP2, should also be sliced along the plane Z5—Z5 in order to permit the removal of the core from such cast product.

It is obvious that the pattern P and/or the gate-pattern G and/or the vent-pattern V, may be covered by any suitable coating CO in Figs. 1 and 2, to permit obtaining a better surface of the mold cavity, and/or to permit an easier removing of the pattern, etc., from the mold parts. Such coatings according to use may be made of one or more of the same or different layers, made of any desirable material, comprising among others, graphite, bentonite, silica wash, water-glass, metal oxides, clay, powdered lava, firebricks, electroplated coatings, rubber-coatings, resin coating, tinplated coatings, etc.

I will now give some examples of materials which may be used to produce a mold.

Example 1

(A) The mold casing is made from iron-carbon alloy, the inner part of which is heavily coated with high temperature refractory such as graphite or metal oxides, bentonite, etc.

(B) The pattern is made from a refractory, such as graphite, metal oxides, or sand mixed with cement, and also coated with high temperature refractory, for instance, graphite pattern coated with $Mg.O$, or $Al_2O_3$.

(C) The material used for the mold is iron-carbon alloy, or copper alloy, poured into the mold-casing in molten state.

(D) The insertions, if any, are used for assembly of mold-parts into a mold, are made from same material as used for the mold or are made from sheets made of suitable refractories.

(E) If bolts, before sawing are used, they may be of aluminum or brass, and after sawing, they may be made of iron-carbon alloy.

Example 2

(A) Mold casing, copper-alloy, or iron-carbon alloy.

(B) Pattern, copper-alloy, or iron-carbon alloy or graphite.

(C) Material for mold, magnesium, or aluminum or their alloys.

Example 3

(A) Mold casing from aluminum or magnesium.

(B) Pattern from copper or brass.

(C) Material for mold, low temperature alloys containing tin, zinc, etc., (for instance, Wood's fusible metal).

Example 4

(A) Mold casing, iron-carbon alloy.

(B) Pattern, pure iron or iron-carbon alloy, coated with high refractory.

(C) Material for mold, iron-carbon alloy, the mold-casing being coated with high refractory.

Example 5

(A) Mold casing, from wood or aluminum.

(B) Pattern, from copper or its alloys, or from tin, zinc alloys.

(C) Material for mold, rubber with admixtures, said rubber being vulcanized up to a degree that it will be:

(1) Stiff enough not to lose its form but remain elastic.

(2) Or that it will be sufficiently hard (such as rubber on automobile tires).

(3) Or that it will become a hard rubber.

Example 6

(A) Mold casing is wood or metal.

(B) Pattern is wood or plastic or metal.

(C) Material for mold is cement, sand or sand mixed with binders.

(D) Setting of the material for mold is made either by self-setting as for cement, sand, for example, or by applying heat as for baking the sand mold, etc.

The so obtained molds may be used as dies or molds. Their mold cavities may have any desirable finish by polishing, or by sand-blasting or chemical treatment, etc.

The mold cavities may be coated with any suitable coatings.

The removal of the cast-product from such an assembled mold is made by taking the mold apart into their respective number of mold-parts, by removing one after another all the mold-parts, and thus freeing the cast-product therefrom.

The mold may be used for any type of casting including static casting, pressure casting, pendulum casting, centrifugal casting and gyrocasting.

The sawing of the mold may be accomplished by sawing the mold in such a manner that the saw follows a straight line or following a curved line, thus obtaining a sawing in a plane plane or in a curved plane. Only straight-line sawings producing plane planes are shown in Figs. 1, 2 and 3, but they do not limit this invention for use of curved planes.

The saw, may be a hack saw, or a hand saw, or a band saw or any other type of saw arrangement.

In Figs. 4 and 5, is shown a band saw, mounted on wheels L1 and L2, rotated on shafts SL1 and SL2, one of the shafts being a driving shaft. The mold-casing MC with the mold M having a pouring gate entrance GE and the air vent or riser exit VE (such as shown in Figs. 3 and 4), attached rigidly to the support SU. If the support is a non-movable support, then the saw X is moved downwards. If the saw is non-movable downwards, then the support is made so that it can move to and fro, for instance, by means of a piston T mounted in a cylinder T1 operated hydraulically or pneumatically by a compressed medium VO supplied by a pump through the pipe T3. The sawing unit may be mounted on a support T4.

The starting positions of the support SU and piston T are shown in dotted lines, in Fig. 5.

The to and fro movement may also be made mechanically by a lever arrangement or by means of pulley arrangement not shown in drawings, being self-explanatory.

The support SU may be if desired guided in one or more guides GU as shown in Fig. 4.

The attachment of the mold casing to the support SU may be made by mechanical or electromechanical means. The latter electro-magnetic attachment is shown by SUM in Fig. 5.

It was previously described that tightening means, such as bolts or chains or cables, placed in passages or holes provided for them by the prefabricated holes provided in tubular members (embedded in the mold making material during the embedding of the pattern) may be used and now it is added that all these tightening means and their components may also be provided in the walls of the mold casing and/or is placed into the inside of such mold-casings before the pouring of the molten material is made into such a mold casing.

Another aspect of this invention provides a method and means of first pouring the mold-making molten material or metal into the mold casing in which no tightening means whatsoever have been provided, and providing the latter means after the pouring was accomplished, and the mold making material is solidified then only and prior to sawing it, such solidified mold making material (with or without the mold casing), is provided with holes, or passages for receiving the tightening means. Such holes may pass throughout this solidified mold making material without touching the pattern, and if desired, such holes may pass also through the walls of the mold casing.

Such holes or passages may be cut out by a milling machine on the very surfaces of the mold making material for which purpose the mold-casing should be removed.

The holes or passages passing throughout the mold may be drilled out.

Only after such holes or passages have been provided the mold making material with the pattern embedded therein and with or without the mold casing is sawed into the mold parts and thereafter the respective sawed-away pattern parts are removed from such mold parts and the latter are assembled into an integral mold by using tightening means, such as, bolts, cables, etc., passing through said holes or passages.

The inner surfaces of the walls of the mold casing when made from iron or iron-carbon alloy or other metal alloys may be coated with a thin layer $1/64''$ or less in thickness, or with thick layer (more than $1/64''$ but less than $1/16''$) and reaching 1-2'' or more in thickness, such layers made from a refractory material or a mixture of refractories and/or made in order to avoid fusing of the mold casing, and/or in order to provide an easier removal of the cast mold from such casing whenever it is required.

Such coated mold casings are of particular use when the mold making material which is poured into such casings is iron-carbon alloy or other metal alloys.

When glass, or quartz or other transparent materials are used as the mold making material, then the molds so obtained are transparent, and may be well adapted for castings where transparent molds are of use or interest.

Still another aspect of this invention comprises the following new method for manufacturing molds:

An empty mold casing MC7, Fig. 6, preferably such a one which is open at the top, and if desired such a one which is sufficiently preheated, is filled with a molten material MM7 up to a predetermined level PL. The filling may be achieved by means of pouring the molten material or metal into the mold casing from its open top, directly from the crucible or by means of a ladle. If desired, the filling of the mold casing may be made up to the edges of the border of the casing.

After the mold casing is thus filled with the molten material or metal, the pattern P, mounted on a rigid support (for instance, on a pouring-gate pattern PG, or vent pattern PV, attached to such a pattern) is introduced into said molten material or metal (is forced or embedded therein) through the open top of the mold casing, and when this pattern has risen the level of the molten material to RL and occupies a predetermined position PP in the mold casing, it is held immobile in such a position until the molten material or metal is solidified to a desired degree of solidification.

During the introduction of the pattern into the molten material or metal and until this molten material or metal is still sufficiently fluid, the pattern or the mold casing or both, may be subjected to a vibratory action by means of a mechanical vibrator VM, or electrical vibrator VE, and the amount of vibration per second as well as their intensities may be controlled and chosen for each particular case in order to provide the best of results for the most dense solidification.

The introduction of the pattern into the molten material may be made rapidly, when the molten metal is for instance, iron-carbon alloy, or at a medium pace in the case of copper alloys, or slowly as in the case of aluminum or tin, zinc, alloys. This length of time for introducing said pattern (complete immerging of the pattern) is thus controlled by the amount of time during which the various mold-making materials or metals are still in a sufficiently fluid state. The admittance of said material or metal may be made by the hands, or by means of a rod or a vise or jaw or electromagnet which are attached or hold the pattern by holding the support or the gate PG, or vent PV, of such pattern which rods, or vise or jaw or magnet are a part of a device. For instance, such a device as a piston cylinder, hydraulically or pneumatically operated unit HA, or such a device as a lever rocking device LA.

One movement of a valve or of a switch or a lever will put these devices in action and immerge the pattern with a controlled speed and controlled depth of immergence in the molten mold making material or metal.

As soon as the material is solidified the solified mold making material with the pattern embedded therein is disconnected from the respective support or vise, etc., and the mold with the pattern and with or without the mold casing is cut by a saw into mold parts as previously stated and then the next steps of the method are applied, as heretofore described.

From the foregoing description of certain embodiments of this invention it should be evident to those reasonably skilled in the art that various further changes and modifications might be made without departing from the spirit or scope of this invention.

Having now particularly described and ascertained the nature of this invention and the manner in which it is to be performed, I declare that what I claim is:

1. A method of manufacturing a mold by means: of a casing, of a fusible material of the group of metals and metal alloys, and of a pattern of the product made from a subtance of the group of metals, metal alloys and refractory materials, said mold having at least two mold parts and having a mold cavity corresponding to the female impression of said pattern, said fusible material having a melting point not higher than the melting point of said substance, said method comprising: (1) holding said pattern within said casing at a distance in respect to each of the inner walls of said casing, said pattern being thus completely surrounded by empty space; (2) pouring said fusible material in molten state into said casing, thus filling with it said empty space, thus embedding said pattern therein; (3) cooling said fusible material in molten state in said casing into a solidified material, thus obtaining a solid block integral with said pattern and said casing; (4) sawing with a saw through said solid block along at least one surface passing through said pattern, thereby sawing through simultaneously said casing, said solidified material and said pattern, thus obtaining at least two separate integral solid parts of said block, each comprising a part of said casing of said solidified material and of said pattern; (5) removing from said solid parts of said block the pattern-parts respectively embedded therein, whereby a part of said mold-cavity is formed in each of so obtained said mold-parts; (6) assembling said mold parts and thus obtaining thereby said mold.

2. A method as set forth in claim 1 wherein said pattern is covered with a layer of refractory material prior to its embedding in said fusible material in molten state.

3. A method of manufacturing a mold by means: of a casing open at least partly to the atmosphere on its top, of a fusible material of the group of metals and metal alloys, and of a pattern of the product made from a substance of the group of metals, metal alloys and refractory materials, said mold having at least two mold parts and having a mold cavity corresponding to the female impression of said pattern, said fusible material having a melting point not higher than the melting point of said substance, said method comprising: (1) holding said pattern within said casing at a distance in respect to each of the inner walls of said casing, said pattern being thus completely surrounded by empty space; (2) pouring said fusible material in molten state into said casing, thus filling with it said empty space, thus embedding said pattern; (3) cooling said fusible material in molten state in said casing into solidified material, thus obtaining a solid block integral with said pattern and said casing; (4) sawing with a saw through said solid block along at least one surface passing through said pattern, thereby sawing through simultaneously said casing, said solidified material and said pattern, thus obtaining at least two separate integral solid parts of said block, each comprising a part of said casing of said solidified material and of said pattern; (5) removing from said solid parts of said block the pattern-parts respectively partially embedded therein, whereby a part of said mold-cavity is formed in each of so obtained said mold-parts; (6) assembling said mold parts and thus obtaining thereby said mold.

4. A method of manufacturing a mold by means: of a casing provided with at least one hollow longitudinal member extending within and throughout said casing and throughout the walls of said casing, thus having its both ends open to the atmosphere, of a fusible material of the group of metals and metal alloys, and of a pattern of the product made from a substance of the group of metals, metal alloys and refractory materials, said mold having at least two mold parts and having a mold cavity corresponding to the female impression of said pattern, said fusible material having a melting not higher than the melting point of said substance, said method comprising: (1) holding said pattern within said casing at a distance in respect to each of the inner walls of said casing, said pattern being thus completely surrounded by empty spaces; (2) pouring said fusible material in molten state into said casing, thus filling with it said empty space, thus embedding said pattern therein; (3) cooling said fusible material in molten state in said casing into a solidified material, thus obtaining a solid block integral with said pattern and said casing; (4) sawing with a saw through said solid block along at least one surface passing through said pattern, thereby sawing through simultaneously said casing, said solidified material and said pattern, thus obtaining at least two separate integral solid parts of said block, each comprising a part of said casing, of said solidified material and of said pattern; (5) removing from said solid parts of said block the pattern-parts respectively partially embedded therein, whereby a part of said mold-cavity is formed in each of so obtained said mold-parts; (6) assembling said mold parts by means of bolts passing through said hollow longitudinal member and thus obtaining thereby said mold.

5. A method of manufacturing a mold by means: of a casing, of a fusible material of the group of metals and metal alloys, and of a pattern of the product made from a substance of the group of metals, metal alloys and refractory materials, said mold having at least two mold parts and having a mold cavity corresponding to the female impression of said pattern, said fusible material having a melting point not higher than the melting point of said substance, said method comprising: (1) holding said pattern within said casing at a distance in respect to each of the inner walls of said casing, said pattern being thus completely surrounded by empty spaces; (2) pouring said fusible material in molten state into said casing, thus filling with it said empty space, thus embedding said pattern therein; (3) cooling said fusible material in molten state in said casing into a solidified material, thus obtaining a solid block integral with said pattern and said casing; (4) sawing with a saw through said solid block along at least one surface passing through said pattern, thereby sawing through simultaneously said casing, said solidified material and said pattern, thus obtaining at least two separate integral solid parts of said block, each comprising a part of said casing of said solidified material and of said pattern; (5) removing from said solid parts of said block the pattern-parts respectively partially embedded therein, whereby a part of said mold-cavity is formed in each of so obtained said mold-parts; (6) inserting along said plane and between said mold parts, except between said part of said mold cavity, a spacer having a thickness substantially equal to the thickness of said saw; (7) assembling said mold parts and thus obtaining thereby said mold.

6. A method of manufacturing a mold by means of a casing, of a fusible material of the group of metals and metal alloys, and of a pattern of the product made from a substance of the group of metal, metal alloy and refractory material, said mold having at least two mold parts and having a mold cavity corresponding to the female impression of said pattern, said fusible material having a melting point not higher than the melting point of said substance, said method comprising: (1) pouring said fusible material in molten state into said casing; (2) inserting said pattern in said fusible material in molten state in said casing and holding it therein in such a manner that said pattern is separated from said casing on all sides by said fusible material; (3) cooling said fusible material in molten state in said casing into a solidified material, thus obtaining a solid block integral with said pattern and said casing; (4) sawing with a saw through said solid block along at least one surface passing through said pattern, thereby sawing through simultaneously said casing, said solidified material and said pattern, thus obtaining at least two separate integral solid parts of said block, each comprising a part of said casing, of said solidified material and of said pattern; (5) removing from said solid part of said block the pattern-parts respectively embedded therein, whereby a part of said mold-cavity is formed in each of so obtained said mold-parts; (6) assembling said mold-parts and thus obtaining thereby said mold.

GEORGE A. RUBISSOW.

REFERENCES CITED

The following references are of record in the file of this patent:

UNITED STATES PATENTS

| Number | Name | Date |
| --- | --- | --- |
| 45,178 | Rillot | Nov. 22, 1864 |
| 138,775 | Williams | May 13, 1873 |
| 180,807 | Tank et al. | Aug. 8, 1876 |
| 223,565 | Webb | Jan. 13, 1880 |
| 982,572 | Browne | Jan. 24, 1911 |
| 1,238,789 | Kralund | Sept. 4, 1917 |
| 1,287,001 | Greenberg | Dec. 10, 1918 |
| 1,372,209 | Terranova | Mar. 22, 1921 |
| 2,119,590 | MacDonald | June 7, 1938 |
| 2,150,962 | Curl | Mar. 21, 1939 |